May 16, 1944.  J. J. HOPFIELD  2,348,905

METHOD OF AND APPARATUS FOR SHAPING GLASS

Filed April 3, 1941  2 Sheets-Sheet 1

Inventor
JOHN J. HOPFIELD.
By
Frank Fraser
Attorney

May 16, 1944.   J. J. HOPFIELD   2,348,905

METHOD OF AND APPARATUS FOR SHAPING GLASS

Filed April 3, 1941   2 Sheets-Sheet 2

Inventor
JOHN J. HOPFIELD.
By Frank Fraser
Attorney

Patented May 16, 1944

2,348,905

UNITED STATES PATENT OFFICE 2,348,905

METHOD OF AND APPARATUS FOR SHAPING GLASS

John J. Hopfield, Toledo, Ohio, assignor to Libbey-Owens-Ford Glass Company, Toledo, Ohio, a corporation of Ohio Application April 3, 1941, Serial No. 386,577

10 Claims. (Cl. 49—7)

The present invention relates broadly to the shaping of glass and more particularly to an improved method of and apparatus for forming ornamental areas and the like in cold sheets or plates of glass.

Although the invention is not restricted to any specific use, one practical application thereof is in the formation of so-called "bull's eyes" or like ornamental areas in glass sheets or plates. The bull's eyes or like ornamental areas produced by the invention consist of concavo-convex lens portions which are formed by heating predetermined areas of the glass to the point of softening and simultaneously shaping the softened areas.

It has been found that if an attempt is made to heat a relatively small area in a sheet or plate of cold glass to softening temperature with a torch or blow pipe in the ordinary manner, the stress set up in the glass causes it to rupture with considerable violence. This is chiefly because the cold outer portion of the glass sheet or plate surrounding the central heated area is put under tensional stress, while the heated glass at the center is under compressional stress. As is well known, glass is relatively weak under tension so that a rupture easily results.

I have discovered, however, that it is possible to heat an area in the middle of a sheet or plate of cold glass to softening temperature if the heated area near the center is small in comparison with the area of the glass. To accomplish this, I make use of a suitable metal mask or shield to limit the heated area during the softening of the center of the glass. I have further discovered that once a small area in the glass sheet or plate is softened, the compressional stress is lessened thereby lessening the tensional stress near the perimeter of the glass so that the size of the softened area can then be increased by heating and softening the glass around the initially softened area. The heating of progressively increasing areas of glass in this manner can be readily accomplished by using a plurality of concentric metal masks or shields which can be removed one at a time as the successive areas are softened with a torch or blow pipe.

After the desired area of a cold sheet or plate of glass has been thus softened, it is necessary that the glass be properly annealed. If, however, the glass sheet is placed quickly into an annealing oven at annealing temperature, the central softened area thereof is cooled by radiation and by conduction to the surrounding glass and cracks out before the sheet as a whole has become warmed in the oven. I have found that this rupture of the glass can be avoided by use of a localized heat source for retarding the cooling of the softened area during transfer of the glass sheet to the annealing oven and which can then be removed after the glass as a whole has become sufficiently heated.

It is therefore the primary aim and object of this invention to provide a novel method of and apparatus for forming areas such as bull's eyes and the like in cold sheets or plates of glass with a minimum danger of glass fracture during the shaping and subsequent annealing operations and also without modifying the surface of the rest of the glass or causing any appreciable distortion thereof.

Other objects and advantages of the invention will become more apparent during the course of the following description, when taken in connection with the accompanying drawings.

In the drawings, wherein like numerals are employed to designate like parts throughout the same:

Figure 1:
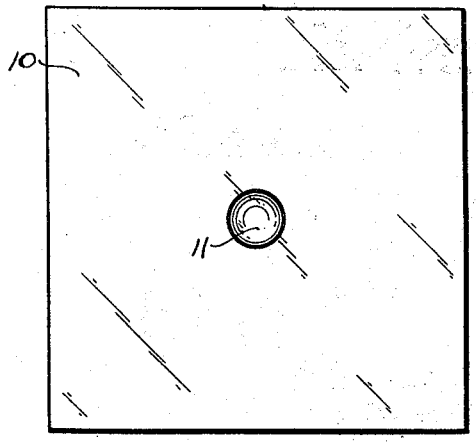
Fig. 1 is a face view of a glass sheet or plate provided centrally thereof with a bull's eye formed in accordance with the invention.
Figure 2:
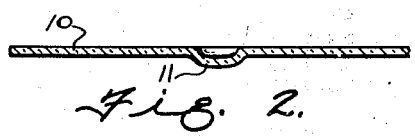
Fig. 2 is a transverse section therethrough.

With reference now to the drawings, there is shown in Figs. 1 and 2 a sheet or plate of glass 10 provided centrally thereof with an ornamental area 11 in the form of a bull's eye. The bull's eye is circular and consists of a concavo-convex lens portion formed by heating this area of the glass to the point of softening and forcing the softened area forwardly beyond the plane of the body of the glass sheet, resulting in a relatively dome-shaped protuberance having a convex front surface and a concave rear surface.

Figure 3:
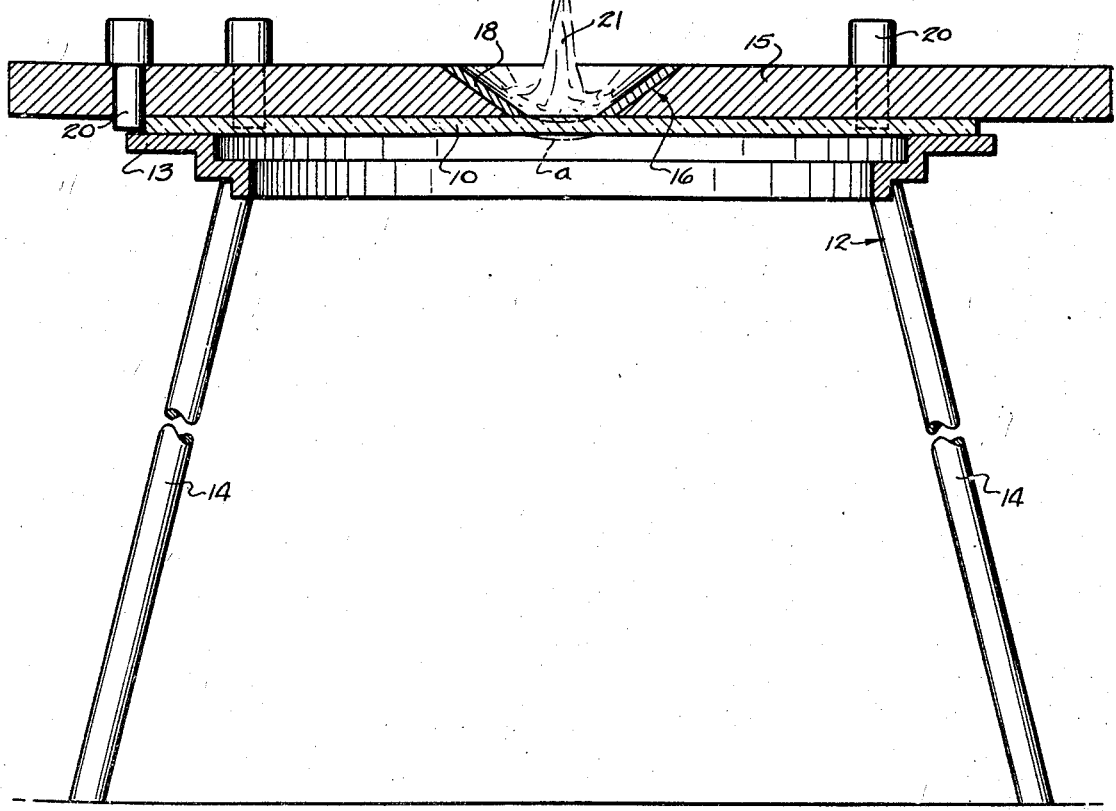
Fig. 3 is a vertical sectional view through one form of apparatus which may be employed in carrying out the method.
Figure 4:
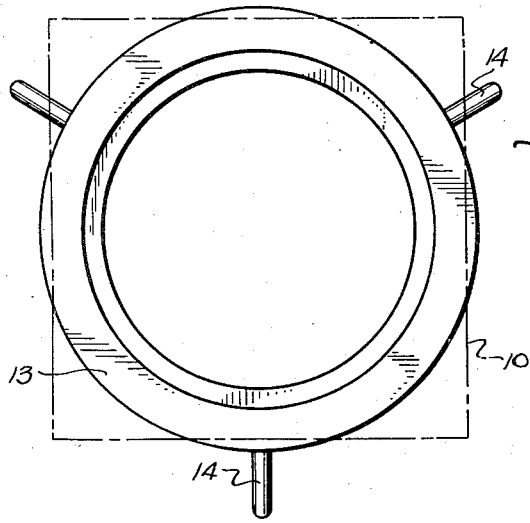
Fig. 4 is a plan view of the apparatus.
Figure 8:
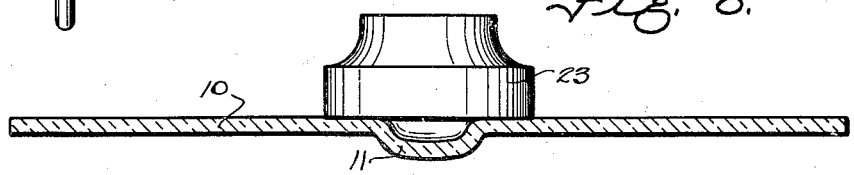
Fig. 8 is a transverse sectional view through the glass sheet after shaping and showing a localized heat source which is associated with the softened area preliminary to annealing.
Figure 5:
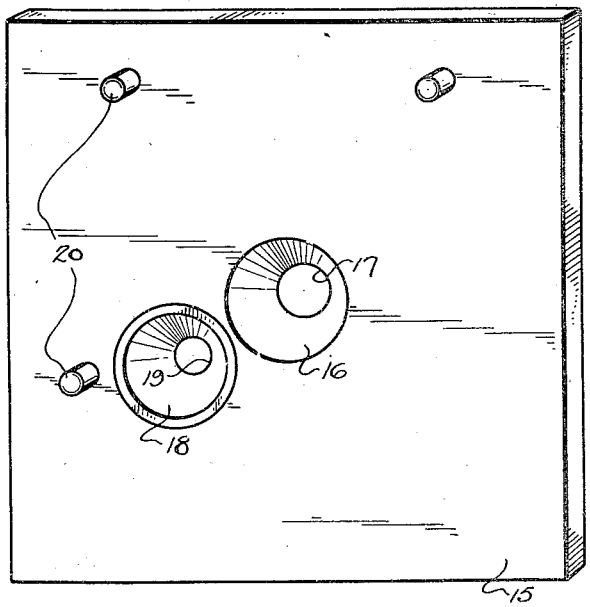
Fig. 5 is a perspective view of the metal mask or shield and the auxiliary or reducing shield which is associated therewith.
Figure 7:
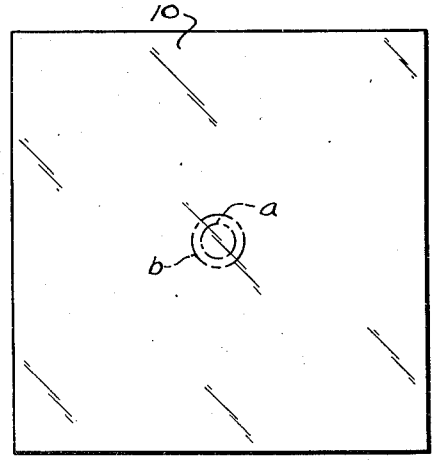
Fig. 7 is a diagrammatic view illustrating the softening of progressively increasing areas of the glass sheet.

The apparatus and several steps employed in forming the bull's eye 11 according to this invention are illustrated in Figs. 3 to 8. As therein shown, the apparatus comprises a suitable stand 12 for supporting the glass sheet 10 during the shaping operation, said stand including a horizontal metal ring 13 carried at the upper ends of legs 14. The ring 13 is relatively large to provide an opening of substantial size therein, and the glass sheet 10 to be shaped is laid horizontally on top of the ring as shown in Fig. 3.

The numeral 15 designates a shield or mask comprising a plate of conducting metal which is supported upon the glass sheet 10 and provided substantially centrally thereof with a conical opening 16, the smaller end 17 of which is adjacent to the glass. The circular portion or area of the glass sheet outlined by the bottom of the conical opening 16 corresponds substantially to the size of the bull's eye or other ornamental area to be formed in the glass sheet. However, as pointed out above, it is exceedingly difficult to heat a relatively large area in a cold sheet or plate of glass to softening temperature without resulting in breakage of the glass; further, that I have discovered that this difficulty can be avoided by first softening a relatively small area at the center of the glass sheet and then gradually increasing the size of the initially softened area while simultaneously preventing the heated area from extending appreciably beyond the predetermined portion to be softened.

To accomplish the above, I propose, during the initial step of heating and softening, to insert an auxiliary or reducing shield 18 within the conical opening 16 in shield plate 15 to reduce the exposed area of the glass. The auxiliary shield 18 consists substantially of a metal funnel which is placed within the opening 16, and it will be seen in Fig. 5 that the opening 19 at the lower end of shield 18 is relatively smaller than the lower end 17 of conical opening 16 in shield plate 15.

Therefore, in carrying out the invention, the auxiliary shield 18 is placed within opening 16 of shield plate 15, as in Fig. 3, and the shield plate then placed upon the top of the glass sheet 10. For the purpose of properly locating the opening 16 in shield plate 15 with respect to the glass, the shield plate may be provided with a plurality of vertical locating pins 20 which extend through openings therein and engage two or more edges of the glass sheet.

Figure 6:
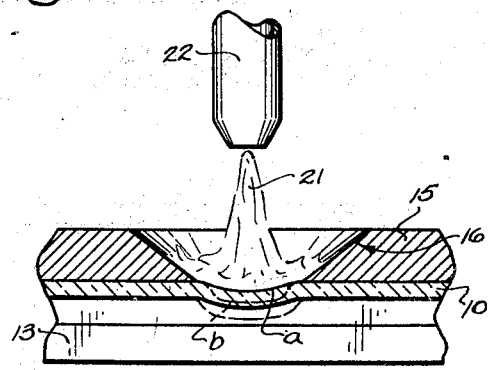
Fig. 6 is a detail sectional view showing the enlarging of the initially softened area after the removal of the reducing shield.

After the shield plate 15 has been properly located upon the glass, the flame 21 from a torch or blow pipe 22 is projected downwardly onto the glass sheet through the auxiliary shield 18 as shown in Fig. 3 to effect the desired heating and softening of that area of glass exposed beneath the opening 19. When that portion of the glass outlined by the removable shield 18 is heated and softened, it will sag downwardly as indicated at $a$. The shield 18 is then removed as shown in Fig. 6, and when this is done the area of the exposed portion of the glass is increased to the size of the lower end 17 of opening 16 in shield plate 15. Upon application of the flame 21, the exposed glass in surrounding relation to the initially softened area $a$ will also be heated to the softening point of the glass causing it to sag downwardly as indicated by the broken lines $b$ in Fig. 6 to form a softened area of predetermined maximum size. As the glass sheet is heated by the flame 21 directed downwardly thereupon, the heat softens the glass until it is sufficiently yielding so that the pressure caused by the blast will cause it to sag downwardly. This sagging of the heated areas is of course assisted by gravity as the glass becomes softened.

By following this two-step method of first softening a small area in the glass sheet and then subsequently increasing the size of the softened area, the compressional stress is lessened during the initial softening thereby lessening the tensional stress near the perimeter of the glass so that a larger area can then be heated and softened without danger of glass fracture. Obviously, the heating may be carried out in any desired number of steps depending upon the area of glass to be softened by using a suitable number of concentric removable shields.

After the softening of the cold sheet or plate of glass has been effected by the above method, it then becomes necessary to anneal the glass. As explained above, if the softened glass sheet is placed quickly into an annealing oven heated to annealing temperature, breakage of the glass is very apt to result. To avoid this glass rupture, I use a localized source of heat for retarding the cooling of the softened area during transfer of the sheet to the annealing oven and also until the sheet as a whole has become sufficiently heated so that the glass may be safely cooled. This localized heat source may comprise a cylindrical iron block 23 (Fig. 8) which is preferably heated red hot and then placed upon the sheet over the softened area 11. After the sheet as a whole has become sufficiently heated in the annealing oven, the block 23 is removed and the entire sheet reduced to room temperature.

If desired, the softened area of glass 11 could be colored by use of proper glass coloring agents during the process of fusion; also, buttons, rods or tubes of glass, or other material of suitable fusion properties and having expansion coefficients approximately that of glass could be placed under the area to be softened and joined to the glass plate by this localized glass fusion method. Likewise, if desired, the softened area could be opened into the attached tube to form an opening through the glass plate leading to the tube.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The method of shaping sheets or plates of glass, comprising shielding the major area of a glass sheet around a minor area consisting of a central unshielded portion and a surrounding shielded portion, heating the central portion of said minor area to the point of softening of the glass, and then unshielding and heating the portion surrounding said central portion also to the softening point of the glass and while said initially heated central portion is still in a softened condition.

2. The method of shaping sheets or plates of glass, comprising shielding the major area of a glass sheet around a minor area consisting of a central unshielded portion and a surrounding shielded portion, heating the central portion of said minor area to the point of softening of the glass, then unshielding and heating the portion surrounding said central portion also to the softening point of the glass and while said initially heated central portion is still in a softened condition, unshielding the major area of the sheet, retarding the cooling of the softened area of the sheet while heating the major area thereof to the maximum temperature attained during annealing, and then annealing the glass sheet.

3. The method of shaping sheets or plates of glass, comprising shielding the major area of a glass sheet around a minor area consisting of a central unshielded portion and a surrounding shielded portion, heating the central portion of said minor area to the point of softening of the glass, then unshielding and heating the portion surrounding said central portion also to the softening point of the glass and while said initially heated central portion is still in a softened condition, unshielding the major area of the sheet, retarding the cooling of the softened area of the sheet by application of a localized heat source to said softened area while heating the major area thereof to the maximum temperature attained during annealing, removing the localized heat source after the major area of the sheet has been heated, and then cooling the entire sheet.

4. The method of shaping sheets or plates of glass, comprising supporting the glass sheet in a horizontal position in such a manner that an area thereof to be shaped is unsupported, shielding the major portion of the upper surface of the sheet around a minor unsupported area consisting of an unshielded central portion and a surrounding portion, heating the unshielded central portion of the area to the point of softening of the glass and causing said softened portion to sag while simultaneously shielding said surrounding portion, and then unshielding and heating the surrounding portion of said area also to the softening point of the glass and while said initially heated central portion is still in a softened condition.

5. The method of shaping sheets or plates of glass, comprising supporting the glass sheet in a horizontal position in such a manner that an area thereof to be shaped is unsupported, shielding the major portion of the upper surface of the sheet around a minor unsupported area consisting of an unshielded central portion and a surrounding portion, heating the unshielded central portion of the area to the point of softening of the glass and causing said softened portion to sag while simultaneously shielding said surrounding portion, then unshielding and heating the surrounding portion of said area also to the softening point of the glass and while said initially heated central portion is still in a softened condition, unshielding the major portion of the sheet, retarding the cooling of the softened area of the sheet while heating the major area thereof to the maximum temperature attained during annealing, and then annealing the glass sheet.

6. The method of shaping sheets or plates of glass, comprising supporting the glass sheet in a horizontal position in such a manner that an area thereof to be shaped is unsupported, shielding the major portion of the upper surface of the sheet around a minor unsupported area consisting of an unshielded central portion and a surrounding portion, heating the unshielded central portion of the area to the point of softening of the glass and causing said softened portion to sag while simultaneously shielding said surrounding portion, then unshielding and heating the surrounding portion of said area also to the softening point of the glass and while said initially heated central portion is still in a softened condition, unshielding the major portion of the sheet, retarding the cooling of the softened area of the sheet by application of a localized heat source to said softened area while heating the major area thereof to the maximum temperature attained during annealing, removing the localized heat source after the major area of the sheet has been heated, and then cooling the entire sheet.

7. Apparatus for shaping sheets or plates of glass, comprising a stand for marginally supporting the glass sheet in a horizontal position, shielding means for the upper surface of the sheet including a plate having an opening therein to surround an area consisting of an unshielded central portion and a surrounding portion, and an auxiliary shield removably received within the opening in said plate for reducing the size thereof and shielding the surrounding portion of said area, and common means for heating said area to first heat the unshielded central portion of the glass sheet to cause a softening and sagging of said portion, and after said auxiliary shield is removed to heat and soften the surrounding portion to increase the size of said softened area.

8. Apparatus for shaping sheets or plates of glass, comprising means for marginally supporting the glass sheet in a horizontal position, shielding means for the upper surface of the sheet including a plate having an opening therein surrounding an area consisting of an unshielded central portion and a surrounding portion, an auxiliary shield removably received within the opening in said plate for reducing the size thereof and shielding the surrounding portion of said area, means for heating said area to first heat the unshielded central portion of the glass sheet to cause a softening and sagging of said portion, and after said auxiliary shield is removed to heat and soften the surrounding portion to increase the size of said softened area, and means carried by said shield plate and engaging the edges of the glass sheet for properly locating said plate upon said sheet.

9. Apparatus for shaping sheets or plates of glass, comprising means for marginally supporting the glass sheet in a horizontal position, shielding means for the upper surface of the sheet including a plate having a conical opening therein surrounding an area consisting of an unshielded central portion and a surrounding portion, a conical auxiliary shield removably received within the conical opening in said plate for reducing the size thereof and shielding the surrounding portion of said area, and means for heating said area to first heat the unshielded central portion of the glass sheet to cause a softening and sagging of said portion, and after said auxiliary shield is removed to heat and soften the surrounding portion to increase the size of said softened area.

10. Apparatus for shaping sheets or plates of glass, comprising means for marginally supporting the glass sheet in a horizontal position, shielding means for the upper surface of the sheet including a plate having a conical opening therein surrounding an area consisting of an unshielded central portion and a surrounding portion, a conical auxiliary shield removably received within the conical opening in said plate for reducing the size thereof and shielding the surrounding portion of said area, means for heating said area to first heat the unshielded central portion of the glass sheet to cause a softening and sagging of said portion, and after said auxiliary shield is removed to heat and soften the surrounding portion to increase the size of said softened area, and locating pins carried by said shield plate and engaging the edges of the glass sheet for locating said plate upon said sheet.

JOHN J. HOPFIELD.